United States Patent
Hirose et al.

(10) Patent No.: US 8,396,816 B2
(45) Date of Patent: Mar. 12, 2013

(54) KERNEL FUNCTION GENERATING METHOD AND DEVICE AND DATA CLASSIFICATION DEVICE

(75) Inventors: Shunsuke Hirose, Tokyo (JP); Satoshi Morinaga, Tokyo (JP); Ryohei Fujimaki, Tokyo (JP)

(73) Assignee: NEC Corporation, Tokyo (JP)

( * ) Notice: Subject to any disclaimer, the term of this patent is extended or adjusted under 35 U.S.C. 154(b) by 929 days.

(21) Appl. No.: 12/448,113

(22) PCT Filed: Jan. 11, 2008

(86) PCT No.: PCT/JP2008/050242
§ 371 (c)(1),
(2), (4) Date: Jun. 9, 2009

(87) PCT Pub. No.: WO2008/084842
PCT Pub. Date: Jul. 17, 2008

(65) Prior Publication Data
US 2010/0115241 A1    May 6, 2010

(30) Foreign Application Priority Data
Jan. 12, 2007   (JP) ................................. 2007-004306

(51) Int. Cl.
*G06N 5/00* (2006.01)
(52) U.S. Cl. ........................................... 706/12; 706/45
(58) Field of Classification Search .................... 706/12, 706/45
See application file for complete search history.

(56) References Cited

FOREIGN PATENT DOCUMENTS

| JP | 2003-256801 A | 9/2003 |
| JP | 2004-341959 A | 12/2004 |
| JP | 2006-085426 A | 3/2006 |

OTHER PUBLICATIONS

Miteran, et al., Automatic Hardware Implementation Tool for a Discrete Adaboost-Based Decision Algorithm, EURASIP Journal on Applied Signal Processing 2005:7, pp. 1035-1046.*
Ha-Nam Nguyen et al., "Unified Kernel Function and Its Training Method for SVM," Lecture Notes in Computer Science, 2006, vol. 4232, pp. 792-800.
K. Sadohara, "Feature selection using Boolean kernels for the learning of Boolean functions," Information Processing Society of Japan Kenkyu Hokoku, Mar. 17, 2004, vol. 2004:29, pp. 187-192.

* cited by examiner

*Primary Examiner* — Wilbert L Starks
(74) *Attorney, Agent, or Firm* — Foley & Lardner LLP

(57) ABSTRACT

Kernel functions, the number of which is set in advance, are linearly coupled to generate the most suitable Kernel function for a data classification. An element Kernel generating unit 102 generates a plurality of element Kernel functions $K_1$-$K_p$ by using a plurality of distance functions (distance scales) $d_1$-$d_p$ prepared in advance.
A Kernel optimizing unit 103 generates an integrated Kernel function K with which the element Kernel functions $K_1$-$K_p$ are linearly coupled, determines coupling coefficients to optimally separate the teacher data z, and optimizes the integrated Kernel function K.
A Kernel component display unit 104 displays each of the element Kernel functions $K_1$-$K_p$, its coupling coefficient, and a distance scale corresponding to each of the element kernel functions on a display device 150.

24 Claims, 6 Drawing Sheets

KERNEL FUNCTION GENERATING METHOD AND DEVICE AND DATA CLASSIFICATION DEVICE

This application is the National Phase of PCT/JP2007/050242, filed Jan. 11, 2009, which claims priority to Japanese Application No. 2006-004306, filed Jan. 12, 2007, the disclosures of which are hereby incorporated by reference in their entirety.

TECHNICAL FIELD

The present invention relates to a Kernel function generating device and to a device which classifies data by using the generated Kernel function.

BACKGROUND ART

Among the methods for classifying data of a plurality of properties, there is a kind of method which uses a Kernel function that defines an inner product (similarity) between vectors while considering the data as vectors on a given space.

As the Kernel function, Gaussian Kernel, polynominal Kernel, and the like are known in general. However, those existing Kernel functions have their good points and bad points, so that they may not be proper for data classification as a target.

Therefore, Patent Document 1 generates a Kernel function which is suited for classifying prescribed data by linearly coupling a plurality of existing Kernel functions.

Hereinafter, the method for generating the Kernel function depicted in Patent Document 1 will be described. In order to discriminate each of the Kernel functions which are linearly coupled with each other and the Kernel function generated by linearly coupling those, the former is called an element Kernel function and the latter is called an integrated Kernel function in this Description.

In Patent Document 1, provided that i-th teacher data is $z_i$, a Gaussian-type Kernel function shown in Expression 1 is initially generated first.

$$K(z_i, z_j) = \exp(-\beta |z_i - z_j|^2) \quad \text{[Expression 1]}$$

Note here that "$\beta = 1/(2\sigma^2)$", and "$\sigma^2$" is a maximum eigen value of a covariance matrix of input vectors (teacher data). Then, it is checked to see whether or not the Kernel function "$K(z_i, z_j)$" satisfies a specific standard based on the teacher data and a prescribed evaluation standard. When judged as unsatisfactory, the integrated Kernel function is updated by adding another Gaussian-type Kernel function (in which "$\beta$" is 1.5 times the current parameter "$\beta$") to the current Kernel function "$K(z_i, z_j)$".

$$K(z_i, z_j) = (K(z_i, z_j) + \exp(-\beta |z_i - z_j|^2)) \quad \text{[Expression 2]}$$

The above processing is repeated until an integrated Kernel function which satisfies the prescribed evaluation standard can be generated.

In the meantime, as other documents regarding the Kernel, there are Patent Document 2 which describes a method for classifying data of $\{0, 1\}$ bit strings by defining a Kernel called a logic Kernel, and Patent Document 3 which describes a technique related to a way to set a separating plane when designating a Kernel. However, neither talks about optimization of the Kernel itself.

Patent Document 1: Japanese Unexamined Patent Publication 2006-085426
Patent Document 2: Japanese Unexamined Patent Publication 2003-256801
Patent Document 3: Japanese Unexamined Patent Publication 2004-341959

Normally, the use of an integrated Kernel function expressed as a linearly coupled form of element Kernel functions can achieve a higher classification performance than the use of one of such element Kernel functions. This is because reproducing Kernel Hilbert spaces corresponding to the total sum of a plurality of element Kernel functions include all the reproducing Kernel. Hilbert spaces corresponding to each of the element Kernel functions, so that the integrated Kernel function that is the sum of the element Kernel functions has a higher expressing capacity than each of the element Kernel functions. Thus, the Kernel function optimizing method proposed in Patent Document 1 is somewhat considered an effective method for generating a Kernel function suited for classifying prescribed data. However, there are following issues.

A first issue is that how many element Kernel functions are to be linearly coupled is not determined in advance until the optimum Kernel function is obtained. As the number of element Kernel functions to be linearly coupled increases, the final integrated Kernel function becomes more complicated. This results in increasing a calculation cost. Even though it is desired to limit the coupling number for suppressing the calculation cost to a certain value or lower, it is not possible to perform optimization of the Kernel function within a range of such coupling number.

A second issue is that contributions of each of the element Kernel functions configuring the optimum integrated Kernel function are unknown. For example, considering a case where a plurality of distance scales of different kinds of properties to be considered are used as a plurality of distance scales that define distances between data of a plurality of properties, and an integrated Kernel function that is obtained by linearly coupling the element Kernels corresponding to each of the distance scales, it becomes possible to discriminate the property that contributes to the classification and the property that does not contribute to the classification if the extent of the contribution of each element Kernel function becomes clear. If so, such technique can be utilized for achieving dimension compression or the like. However, it is difficult to be achieved with Patent Document 1.

An object of the present invention is to generate an integrated Kernel function that is optimum for classifying data, through linearly coupling preset number of element Kernel functions.

Another object of the present invention is to clarify the contributions of each of the element Kernel functions which configure the optimum integrated Kernel function.

Still another object of the present invention is to perform data classification, data compression, or factor estimation by using the generated integrated Kernel function.

DISCLOSURE OF THE INVENTION

In order to achieve the foregoing objects, the Kernel function generating device according to the present invention includes: a Kernel generating unit which generates respective element Kernel functions for a plurality of distance scales read out from a storage device; and a Kernel optimizing unit which generates an integrated Kernel function by reading out the plurality of generated element Kernel functions from the storage device and linearly coupling those functions, determines coupling coefficients of the integrated Kernel function with which the teacher data can be separated optimally, and writes the determined coupling coefficients to the storage device.

The Kernel function generating method according to the present invention is a method for generating a Kernel function by using a computer, which is structured to include: a first step in which the computer reads a plurality of distance scales from a storage device, generates an element Kernel functions for each of the distance scales, and writes those element Kernel functions to the storage device; and a second step in which the computer generates an integrated Kernel function by linearly coupling the plurality of element Kernel functions read out from the storage device, determines coupling coefficients in such a manner that the generated integrated Kernel function optimally separates teacher data read out from the storage device, and writes the coupling coefficients to the storage device.

The present invention can provide following effects.

A first effect is that it is possible to generate the optimum integrated Kernel function by using the preset number of element Kernel functions. The reason is that the optimum integrated Kernel function is generated by employing the method which determines the coupling coefficients in such a manner that the plurality of linearly coupled element Kernel functions separate the teacher data optimally.

A second effect is that the contributions of each of the element Kernel functions in the optimum integrated Kernel function can be made apparent. The reason is that the coupling coefficient of the element Kernel function that has a small contribution becomes small, and the coupling coefficient of the element Kernel function that has a large contribution becomes large in the optimum integrated Kernel function.

BEST MODE FOR CARRYING OUT THE INVENTION

Next, exemplary embodiments of the invention will be described in detail by referring to the drawings.

FIRST EXEMPLARY EMBODIMENT

Referring to FIG. 1, a Kernel function generating device according to a first exemplary embodiment of the invention includes: a processor 100 operated by controls of a program; a teacher data storage unit 110 configured with a magnetic disk, a semiconductor memory, or the like; a distance function storage unit 120; an element Kernel storage unit 130; an integrated Kernel storage unit 140; a display device 150 configured with a liquid crystal display and the like; and an input device 160 configured with a keyboard and the like.

The teacher data storage unit 110 stores a plurality of pieces of teacher data z. The teacher data z is configured with a plurality of properties $a_1, a_2, ---, a_m$. That is, the teacher data z can be treated as vector data having $a_1, a_2, ---, a_m$ as elements. The i-th teacher data among the plurality of pieces of teacher data is expressed as "zi". Further, a label value y is added to the teacher data z. The label value y indicates which cluster the teacher data z belongs to. In this exemplary embodiment, the label value takes either "+1" or "−1".

For example, in a case of classifying data (a record regarding the number of entering/leaving to/from a specific room, access capacity of a web, etc.) into data corresponding to a proper behavior and data corresponding to an improper behavior, it is considered that the teacher data z corresponds to the data regarding the number of entering/leaving to/from a specific room, access capacity of a web, etc., and the label "+1" is given to the data corresponding to the proper behavior while the label "−1" is given to the data corresponding to the improper behavior.

The distance function storage unit 120 stores a plurality of distance functions $d_1-d_p$. Each of the distance functions $d_1-d_p$ is a scale of the distance, which defines the distance between the data z having the plurality of properties $a_1, a_2, ---, a_m$. In the case of this exemplary embodiment, each of the distance functions $d_1-d_p$ differs in kinds of properties being considered. Specifically, the distance function $d_1$ defines the distance between the data z regarding the value of the property $a_1$. Further, the distance function $d_2$ defines the distance between the data z regarding the value of the property $a_2$. Furthermore, the number of distance functions is equal to the number of properties (i.e., m=p), so that the distance function $d_p$ defines the distance between the data z regarding the value of the property $a_m$.

In general, as the distance between data, there are various kinds such as Euclidean distance, Minkowski distance, editing distance, Hamming distance, a difference between generating frequencies, and a distance between logarithmic loses of the generating frequencies. In the case of this exemplary embodiment, the kinds of the distances expressed with the distance functions $d_1-d_p$ are all the same, and one of the above is used. Assuming here that a generating probability of data x is learnt by some kind of model and the generating probability is p(x), "|p(x)−p(y)|" is called a difference between the generating frequencies of the data x and data y, and |−log [p(x)]−(−log [p(y)])|" is called a difference between the logarithmic losses of the generating frequencies.

Further, for the same kind of the distances, the scale can be changed, i.e., to take a value of twice the distance or square of the distance. In this exemplary embodiment, however, the scales of all the distance functions $d_1-d_p$ are the same.

The element Kernel storage unit 130 stores element Kernel functions $K_1-K_p$ which are generated by corresponding to each of the distance functions $d_1-d_p$.

The integrated Kernel storage unit 140 stores the integrated Kernel function K which is generated by linearly coupling the element Kernel functions $K_1-K_p$.

The input device 160 is used for supplying data and instructions such as start-up instructions from a user to the processor 100.

The display device 150 is used for outputting processed results of the processor 100 and the data being processed to the user. Here, the display device 150 is used as an example of the device for outputting the processed results and the like to the user. However, the display device may be other kinds of output device such as a printer.

The processor 100 has a teacher data input unit 101, an element Kernel generating unit 102, a Kernel optimizing unit 103, and a Kernel component display device 104.

The teacher data input device 101 reads out a plurality of teacher data z in order from the teacher data storage unit 110, and transmits those to the Kernel optimizing unit 103.

The element Kernel generating unit 102 reads out the plurality of distance functions $d_1-d_p$ in order from the distance function storage unit 120, generates the element Kernel functions $K_1-K_p$ which correspond one on one to the respective distance functions $d_1-d_p$, and saves those in the element Kernel storage unit 130.

The Kernel optimizing unit 103 reads out the element Kernel functions $K_1-K_p$ from the element Kernel storage unit 130, determines the coupling coefficients in such a manner that the integrated Kernel function K generated by linearly coupling the element Kernel functions separate the teacher data z optimally, and saves the optimized integrated Kernel function K in the integrated Kernel storage unit 140.

The Kernel component display unit 104 displays the coupling coefficients of each of the element Kernel functions $K_1$-$K_p$ in the integrated kernel function K read out from the integrated Kernel storage unit 140, the distance functions $d_1$-$d_p$ read out from the distance function storage unit 120, and the element Kernel functions $K_1$-$K_p$ read out from the element Kernel storage unit 130, on the display device 150. Display of either of the distance functions $d_1$-$d_p$ or the element Kernel functions $K_1$-$K_p$ may be omitted.

The exemplary embodiment of the invention generates a plurality of element Kernel functions from a plurality of distance scales prepared in advance, and determines the coupling coefficients in such a manner that the integrated Kernel function obtained by linearly coupling those element Kernel functions separate the teacher data optimally. The coupling coefficient is the weight of each element Kernel function. It takes a value from 0 to 1, both inclusive, and the total sum thereof becomes 1. Provided that there are p-pieces of element Kernel functions, the structure of the integrated Kernel function changes when the values of each coupling coefficient are changed. The possible number of structures is larger than that of a conventional method in which the p-pieces of element Kernel functions are added with a same weight. Therefore, it is possible to generate the optimum integrated Kernel function. Further, the extent of contributions of the element Kernel functions can become apparent according to the determined coupling coefficients.

Next, operations of the Kernel function generating device according to the exemplary embodiment will be described.

When the user stores the plurality of teacher data z to the teacher data storage unit 110 and the plurality of distance functions $d_1$-$d_p$ to the distance function storage unit 120, respectively, and inputs an instruction for generating the Kernel function through the input device 160, the processor 100 starts to execute the processing shown in FIG. 2.

First, the element Kernel generating unit 102 of the processor 100 receives inputs of the distance functions $d_1$-$d_p$ from the distance function storage unit 120, generates the corresponding element Kernel functions $K_1$-$K_p$, and stores those to the element Kernel storage unit 130 (step S101). As a method for generating the element Kernel functions corresponding to the distance functions, there is a method shown with Expression 3, for example.

$$K_1(z_i,z_j) \equiv \exp[-d_1(z_j-z_i)^2]$$
$$K_2(z_i,z_j) \equiv \exp[-d_2(z_i-z_j)^2]$$
$$\cdots$$
$$K_p(z_i,z_j) \equiv \exp[-dp(z_i-z_j)^2] \quad \text{[Expression 3]}$$

The Gaussian-type Kernel is used in this case. However, other types of Kernel functions can be also used as long as those are the Kernel functions which always take positive values.

Next, the Kernel optimizing unit 103 linearly couples the element Kernel functions $K_1$-$K_p$ with the coupling coefficients $c_1$-$c_p$ to generate the integrated Kernel function K shown in Expression 4, and stores it to the integrated Kernel storage unit 140 (step S102). Then, the integrated Kernel function K is optimized through properly determining the coupling coefficients $c_1$-$c_p$ by using the teacher data z inputted through the teacher data input device 101 (step S103).

$$K(z_i,z_j) \equiv \Sigma_{n=1}^{P} c_n k_n(z_i,z_j) \quad \text{[Expression 4]}$$

A space where the function defining the inner product (similarity) between the vectors when considering data as the vectors on a given space is expressed by the Kernel function is called a Kernel space. All the coupling coefficients $c_1$-$c_p$ are determined in such a manner that the consistency degree between clusters of the teacher data z with the label +1 and clusters of the teacher data with the label −1 becomes the minimum in the Kernel space where the Kernel function is expressed with Expression 4. Regarding values for the consistency degree, a larger value indicates that the both are more similar, and a smaller value indicates that both are separated in a better manner.

For example, an amount such as Q in Expression 5 can be used as the consistency degree.

$$Q \equiv \frac{\frac{1}{MN}\sum_{i,y_i=+1}\sum_{j,y_j=-1} K(z_i,z_j)^2}{\frac{1}{M(M-1)}\sum_{i \neq j, y_i=+1, y_j=+1} K(z_i,z_j) + \frac{1}{N(N-1)}\sum_{i \neq j, y_i=-1, y_j=-1} K(z_i,z_j)}$$

$$= \frac{\sum_{l,m=1}^{p} c_l c_m \left( \frac{1}{MN}\sum_{i,y_i=+1}\sum_{j,y_j=-1} K_l(z_i,z_j)K_m(z_i,z_j) \right)}{\sum_{l=1}^{p} c_l \left( \frac{1}{M(M-1)}\sum_{i \neq j, y_i=+1, y_j=+1} K_l(z_i,z_j) + \frac{1}{N(N-1)}\sum_{i \neq j, y_i=-1, y_j=-1} K_l(z_i,z_j) \right)}$$

[Expression 5]

This Q is a quotient obtained when the sum of the similarities between data having different labels is divided by the sum of the similarities between the data having the same labels. Having the small value for the Q corresponds to having the low similarity between the cluster of the data having the label +1 and the cluster of the data having the label −1. In the case of this example, the coupling coefficients $c_1$-$c_p$ with which Q in Expression 5 can be minimized may be found, under two conditions of Expression 6 where the number of data having label +1 is M, the number of data having the label −1 is N, and the number of element Kernel functions is P.

$$\Sigma_{n=1}^{P} c_n = 1$$
$$c_n \geq 0$$
where n=1, - - -, P  [Expression 6]

Then, the Kernel component display unit 104 displays the distance functions $d_1$-$d_p$ and the element Kernel functions $K_1$-$K_P$ corresponding to the coupling coefficients $c_1$-$c_p$ obtained by the Kernel optimizing unit 103 on the display device 150 (S104).

Next, effects of the exemplary embodiment will be described.

With the exemplary embodiment, it is possible to generate the integrated Kernel function that is optimum for classifying data and to clarify the contributions of each of the element Kernel functions which configure the integrated Kernel function.

Further, the properties of the data and the distance functions $d_1$-$d_p$ as well as the distance functions $d_1$-$d_p$ and the element Kernel functions $K_1$-$K_P$ correspond to each other on one on one basis, so that it is possible to check the contributions of each property of the data to classification of the data because the contributions of the element Kernel functions can be made apparent.

Thus, dimension compression of the data can be performed through eliminating property $a_n$ from the data, since the property $a_n$ corresponding to the element Kernel function $K_n$ whose coupling coefficient $c_n$ is small has only a small contribution to classification of the data. Further, through looking at the distance function dn and the element Kernel function $K_n$ corresponding to the element Kernel function $K_n$ whose coupling coefficient $c_n$ is large, it is possible to recognize which property exhibits a large contribution when classifying the teacher data to the cluster of the +1 label and the cluster of the −1 label. Therefore, it is possible to estimate the factor for classifying those clusters.

(Modification of First Exemplary Embodiment)

In the first exemplary embodiment described above, regarding the distance functions $d_1$-$d_p$, the distance between the data z is defined as the distance regarding a single property value within the data. However, it is also possible to be defined as the distance regarding a combination of a plurality of properties within the data z. Further, other than the method which generates the distance functions $d_1$-$d_p$ by changing the combination of the properties (called a first method) in the manner described above, there are also second and third methods described below.

The second method is a method that changes the kinds of distances, which defines the distances between the data by using various kinds of distances such as Euclidean distance, Minkowski distance, editing distance, Hamming distance, a difference between generating frequencies, and a distance between logarithmic loses of the generating frequencies. For example, there is a case where the distance function $d_1$ defines the Euclidean distance between the data z, and the distance function $d_2$ defines the Minkowski distance between the teacher data z.

The third method is a method that changes the way of scaling, which defines the distances by changing the way of scaling, such as changing the scale by taking the distance that is onefold or twofold of the distance defined by the first or the second method or the distance that is the square or the cube of the distance defined by the first or the second method.

Further, it is also possible to generate the distance functions by a method that is a combination of the first, the second, and the third methods.

SECOND EXEMPLARY EMBODIMENT

Referring to FIG. 3, a data classification device according to a second exemplary embodiment of the invention includes: a processor 200 operated by controls of a program; a teacher data storage unit 110 configured with a magnetic disk, a semiconductor memory, or the like; a distance function storage unit 120; an element Kernel storage unit 130; an integrated Kernel storage unit 140; a no-teacher data storage unit 210; a classified result storage unit 220; a display device 150 configured with a liquid crystal display and the like; and an input device 160 configured with a keyboard and the like.

The teacher data storage unit 110, the distance function storage unit 120, the element Kernel storage unit 130, the integrated Kernel storage unit 140, the display device 150, and the input device 160 are the same as those of the first exemplary embodiment.

The no-teacher data storage unit 210 stores a plurality of no-teacher data 211 as the classification target. The no-teacher data 211 is the data that is in the same type (the number of properties and the definitions of the contents of each property are the same) as that of the teacher data z but has no labels of +1 and −1.

The classified result storage unit 220 stores a result 221 obtained by classifying the no-teacher data 211.

In addition to having a teacher data input device 101, an element Kernel generating unit 102, a Kernel optimizing unit 103, and a Kernel component display unit 104, which are the same as those of the first exemplary embodiment, the processor 200 further has a no-teacher data input unit 201, a no-teacher data classification unit 202, and a classified result display unit 203.

The no-teacher data input device 201 reads out the no-teacher data 211 from the no-teacher data storage unit 210 in order, and transmits it to the no-teacher data classification unit 202.

The no-teacher data classification unit 202 reads out the optimized integrated Kernel function K from the integrated Kernel storage unit 140, classifies the no-teacher data 211 based on the integrated Kernel function K, and saves the classified result 221 to the classified result storage unit 220.

The classified result display unit 203 reads out the classified result 221 from the classified result storage unit 220, and displays it on the display device 150.

Next, operations of the data classification device according to the exemplary embodiment will be described. The operation when generating the optimum integrated Kernel function K from the distance functions $d_1$-$d_p$ by using the teacher data z with the use of the teacher data input unit 101, the element Kernel generating unit 102, the Kernel optimizing unit 103, and the Kernel component display unit 104 is the same as that of the first exemplary embodiment, so that the explanation thereof is omitted. The operation when classifying the no-teacher data 211 by using the generated integrated Kernel function K is as follows.

The no-teacher data classification unit 202 reads out the integrated Kernel K from the integrated Kernel storage unit 140, reads out the no-teacher data 211 from the no-teacher data storage unit 210 through the no-teacher data input unit 201, solves a 2-class classification problem of the no-teacher data, and saves the result thereof as the classified result 221.

A method that can be conducted by using the Kernel function is used for the 2-class classification. As the method to be used, there are a classifying method with no teacher and a classifying method with teacher. In the exemplary embodiment, the classifying method with no teacher is used. An example of the classifying method with no teacher may be a Kernel k-means method. With the classifying method with no teacher, the no-teacher data 211 is classified into two groups.

The classified result display unit 203 reads out the classified result 221 from the classified result storage unit 220, and displays it on the display device 150.

Next, effects of the exemplary embodiment will be described.

With this exemplary embodiment, it is possible to classify the no-teacher data 211 by using the optimized integrated Kernel function K which is generated in the same manner as that of the first exemplary embodiment.

Further, this exemplary embodiment uses the data classifying method with no teacher data. Therefore, it has such an advantage that teacher data z is not required for classifying the data.

THIRD EXEMPLARY EMBODIMENT

Referring to FIG. 4, a data classification device according to a third exemplary embodiment of the invention is different from the data classification device according to the second exemplary embodiment shown in FIG. 3 in respect that the no-teacher data classification unit 202 of the processor 200 is replaced with a no-teacher data classification unit 204.

The no-teacher data classification unit 204 classifies the no-teacher data 211 based on the optimized integrated Kernel function K read out from the integrated Kernel storage unit 140, the teacher data z read out from the teacher data storage unit 110 through the teacher data input device 101, and the no-teacher data 211 read out from the no-teacher data storage unit 210 through the no-teacher data input unit 201, and saves the classified result 221 to the classified result storage unit 220. That is, the no-teacher data classification unit 204 is different from the no-teacher data classification unit 202 of the second exemplary embodiment in respect that it solves the 2-class classification problem of the no-teacher data by using the classifying method with teacher data.

As the classifying method with teacher, there are SVM (Support Vector Machine) and a Kernel judging analysis, for example. With the classifying method with teacher, the no-teacher data 211 is classified into a group of data with the label +1 and a group of data with the label −1.

Next, effects of the exemplary embodiment will be described.

With the exemplary embodiment, it is possible to classify the no-teacher data 211 by using the optimized integrated Kernel function K which is generated in the same manner as that of the first exemplary embodiment.

Further, this exemplary embodiment uses the data classifying method with teacher. Therefore, it has such an advantage that the no-teacher data 211 can be classified into a group of data with the label +1 and a group of data with the label −1.

FOURTH EXEMPLARY EMBODIMENT

Referring to FIG. 5, a data compression device according to a fourth exemplary embodiment of the invention includes: a processor 300 operated by controls of a program; a teacher data storage unit 110 configured with a magnetic disk, a semiconductor memory, or the like; a distance function storage unit 120; an element Kernel storage unit 130; an integrated Kernel storage unit 140; a compression-target data storage unit 310; a compression result storage unit 320; a display device 150 configured with a liquid crystal display and the like; and an input device 160 configured with a keyboard and the like.

The teacher data storage unit 110, the distance function storage unit 120, the element Kernel storage unit 130, the integrated Kernel storage unit 140, the display device 150, and the input device 160 are the same as those of the first exemplary embodiment.

The compression-target data storage unit 310 stores a plurality of pieces of data 311 as the compression target. The compression-target data 311 is the data that is in the same type (the number of properties and the definitions of the contents of each property are the same) as that of the teacher data z. It is not an issue whether or not the data has the labels of +1 and −1.

The compression result storage unit 320 stores a result 321 obtained by compressing the compression-target data 311.

In addition to having a teacher data input unit 101, an element Kernel generating unit 102, a Kernel optimizing unit 103, and a Kernel component display unit 104, which are the same as those of the first exemplary embodiment, the processor 300 further has a compression-target data input unit 301, a data compression unit 302, and a compression result display unit 303.

The compression-target data input device 301 reads out the compression-target data 311 from the compression-target data storage unit 310 in order, and transmits it to the data compression unit 302.

The data compression unit 302 reads out the coupling coefficients $c_1$-$c_p$ of the optimized integrated Kernel function K from the integrated Kernel storage unit 140, determines the property to be eliminated by making comparisons with a threshold value that is set in advance, performs dimension compression through eliminating the determined property from the compression-target data 311, and saves a result 321 to the compression result storage unit 320.

The compression result display unit 303 reads out the compression result 321 from the compression result storage unit 320, and displays it on the display device 150.

Next, operations of the data compression device according to the exemplary embodiment will be described. The operation when generating the optimum integrated Kernel function K from the distance functions $d_1$-$d_p$ by using the teacher data z with the use of the teacher data input device 101, the element Kernel generating unit 102, the Kernel optimizing unit 103, and the Kernel component display device 104 is the same as that of the first exemplary embodiment, so that the explanation thereof is omitted. The operation when performing dimension compression of the compression-target data 311 by using the generated integrated Kernel function K is as follows.

The data compression unit 320 first determines the property to be eliminated by comparing the coupling coefficients $c_1$-$c_p$ of the integrated Kernel function K with the threshold value that is set in advance. As described in the first exemplary embodiment, when each of the properties $a_1, a_2, - - -, a_m$ of the teacher data z, each of the distance functions $d_1, d_2, - - -, d_p$, the element Kernel functions $k_1, k_2, - - -, k_p$, and the coupling coefficients $c_1, c_2, - - -, c_p$ correspond on one on one basis, the property belonging to the coupling coefficient that is smaller than the threshold value can be determined uniquely. On an assumption here that the coupling coefficients smaller than the threshold value are the two coefficients $c_1$ and $c_2$, for example, the two properties $a_1$ and $a_2$ are the targets to be eliminated.

Then, the data compression unit 302 reads out the compression-target data 311 from the compression-target data storage unit 310 in order through the compression-target data input unit 301, and saves, to the compression result storage unit 320, the data that is the result obtained by eliminating the elimination-target property from the compression-target data 311 as the compression result 321.

The compression result display unit 303 reads out the compression result 321 from the compression result storage unit 320, and displays it on the display device 150.

Next, effects of the exemplary embodiment will be described.

With this exemplary embodiment, it is possible to perform dimension compression of the compression-target data 311 by using the optimized integrated Kernel function K which is generated in the same manner as that of the first exemplary embodiment.

FIFTH EXEMPLARY EMBODIMENT

Referring to FIG. 6, a factor estimating device according to a fifth exemplary embodiment of the invention includes: a processor 400 operated by controls of a program; a teacher data storage unit 110 configured with a magnetic disk, a semiconductor memory, or the like; a distance function storage unit 120; an element Kernel storage unit 130; an integrated Kernel storage unit 140; an estimation result storage unit 410; a display device 150 configured with a liquid crystal display and the like; and an input device 160 configured with a keyboard and the like.

The teacher data storage unit 110, the distance function storage unit 120, the element Kernel storage unit 130, the integrated Kernel storage unit 140, the display device 150, and the input device 160 are the same as those of the first exemplary embodiment.

The estimation result storage unit 410 stores an estimation result 411 of the property that is a factor for classifying the teacher data z stored in the teacher data storage unit 110 into two groups, i.e., a group of data with the label +1 and a group of data with the label −1.

In addition to having a teacher data input unit 101, an element Kernel generating unit 102, a Kernel optimizing unit 103, and a Kernel component display unit 104, which are the same as those of the first exemplary embodiment, the processor 400 further has a factor estimating unit 401 and an estimation result display unit 402.

The factor estimating unit 401 reads out the coupling coefficients $c_1$-$c_p$ of the optimized integrated Kernel function K from the integrated Kernel storage unit 140, determines the property that is the factor for classifying the teacher data z into two groups by making comparisons with a threshold value that is set in advance, and saves the determined property to the estimation result storage unit 410 as the estimation result 411.

The estimation result display unit 402 reads out the estimation result 411 from the estimation result storage unit 410, and displays it on the display device 150.

Next, operations of the factor estimating device according to the exemplary embodiment will be described. The operation when generating the optimum integrated Kernel function K from the distance functions $d_1$-$d_p$ by using the teacher data z with the use of the teacher data input unit 101, the element Kernel generating unit 102, the Kernel optimizing unit 103, and the Kernel component display unit 104 is the same as that of the first exemplary embodiment, so that the explanation thereof is omitted. The operation when estimating the factor by using the generated integrated Kernel function K is as follows.

The factor estimating unit 401 compares the coupling coefficients $c_1$-$c_p$ of the integrated Kernel function K with the threshold value set in advance, and estimates the property corresponding to the coupling coefficient that is equal to or larger than the threshold value as the factor property. As described in the first exemplary embodiment, when each of the properties $a_1, a_2, ---, a_m$ of the teacher data z, each of the distance functions $d_1, d_2, ---, d_p$, the element Kernel functions $k_1, k_2, ---, k_p$, and the coupling coefficients $c_1, c_2, ---, c_p$ correspond on one on one basis, the property belonging to the coupling coefficient that is larger than the threshold value is determined uniquely. The factor estimating unit 401 saves the estimation result 411 to the estimation result storage unit 410.

The estimation result display unit 402 reads out the estimation result 411 from the estimation result storage unit 410, and displays it on the display device 150.

Next, effects of the exemplary embodiment will be described.

With this exemplary embodiment, it is possible to estimate the property that is the factor for classifying the teacher data z into two groups by using the optimized integrated Kernel function K which is generated in the same manner as that of the first exemplary embodiment.

Further, other exemplary embodiments of the invention will be described. A Kernel function generating device according to another embodiment of the present invention may be structured to include: a Kernel generating unit which generates respective element Kernel functions for a plurality of distance scales that are read out from a storage device and writes those to the storage device; and a Kernel optimizing unit which generates an integrated Kernel function by reading out the plurality of generated element Kernel functions from the storage device and linearly coupling those functions, determines coupling coefficients of the integrated Kernel function with which the teacher data can be separated optimally, and writes the determined coupling coefficients to the storage device.

The Kernel function generating device may be structured to read out at least the distance scale or the corresponding Kernel function and the corresponding coupling coefficient from the storage device, and to output those to an output device. Further, it is desirable for the plurality of distance scales to be a plurality different distance functions which respectively define distances between data of a plurality of different properties. It is desirable for the different distance functions to consider different kinds of properties. It is desirable for the different distance functions to be of different kinds of distances. It is desirable for the different distance functions to be in different distance scales.

Regarding the teacher data, it is desirable for the teacher data to have a same label added to the data belonging to a same cluster and a different label added to the data belonging to a different cluster. The Kernel optimizing unit may determine the values of the coupling coefficients in such a manner that the consistency degree between different clusters becomes the minimum. The Kernel optimizing unit may determine the values of the coupling coefficients with which the value obtained through dividing the sum of the similarities between the data having different labels by the sum of the similarities between the data having the same labels becomes the minimum.

It is also possible to provide a no-teacher data classification unit which classifies the no-teacher data by using the generated integrated Kernel function. It is also possible to provide a data compression unit which compares the coupling coefficients of the integrated Kernel function with a threshold value to determine a property that corresponds to the coupling coefficient equal to or less than the threshold value as an elimination-target property, and performs dimension compression to eliminate the elimination-target property from compression-target data. It is possible to provide a factor estimating unit which compares the coupling coefficients of the integrated Kernel function with the threshold value, and estimates the property corresponding to the coupling coefficient equal to or larger than the threshold value as the property that is the factor for classifying the teacher data into a plurality of groups.

A Kernel function generating method according to another exemplary embodiment of the invention is a method which generates a Kernel function by using a computer, which may be structured to include: a first step in which the computer reads a plurality of distance scales from a storage device, generates an element Kernel functions for each of the distance scales, and writes those element Kernel functions to the storage device; and a second step in which the computer generates an integrated Kernel function by linearly coupling the plurality of element Kernel functions read out from the storage device, determines coupling coefficients in such a manner that the generated integrated Kernel function optimally separates teacher data read out from the storage device, and writes the coupling coefficients to the storage device.

It is also possible to include a third step in which the computer reads out at least the distance scale or the corresponding element Kernel function and the corresponding coupling coefficient from the storage device, and outputs those to an output device.

The exemplary embodiments of the invention have been described above. However, the present invention is not limited only to the embodiments described above, but various kinds of additional modifications are possible. Further, the Kernel function generating device, the data classification device, the data compression device, and the factor estimating device can be achieved not only by means of hardware but also by means of a computer and a program. The program is provided by being recorded in a computer-readable recording medium such as a magnetic disk or a semiconductor memory. The program is read by a computer when the computer is started up, for example. Through controlling the operations of the computer, the computer can be functionalized as the Kernel function generating device, the data classification device, the data compression device, and the factor estimating device of each of the above-described embodiments to execute the processing described above.

While the present invention has been described by referring to the embodiments (and examples), the present invention is not limited only to those embodiments (and examples) described above. Various kinds of modifications that occur to those skilled in the art can be applied to the structures and details of the present invention within the scope of the present invention.

This application claims the Priority right based on JP 2007-004306 filed on Jan. 12, 2007, and the disclosure thereof is hereby incorporated by reference in its entirety.

REFERENCE NUMERALS

Figure 1:
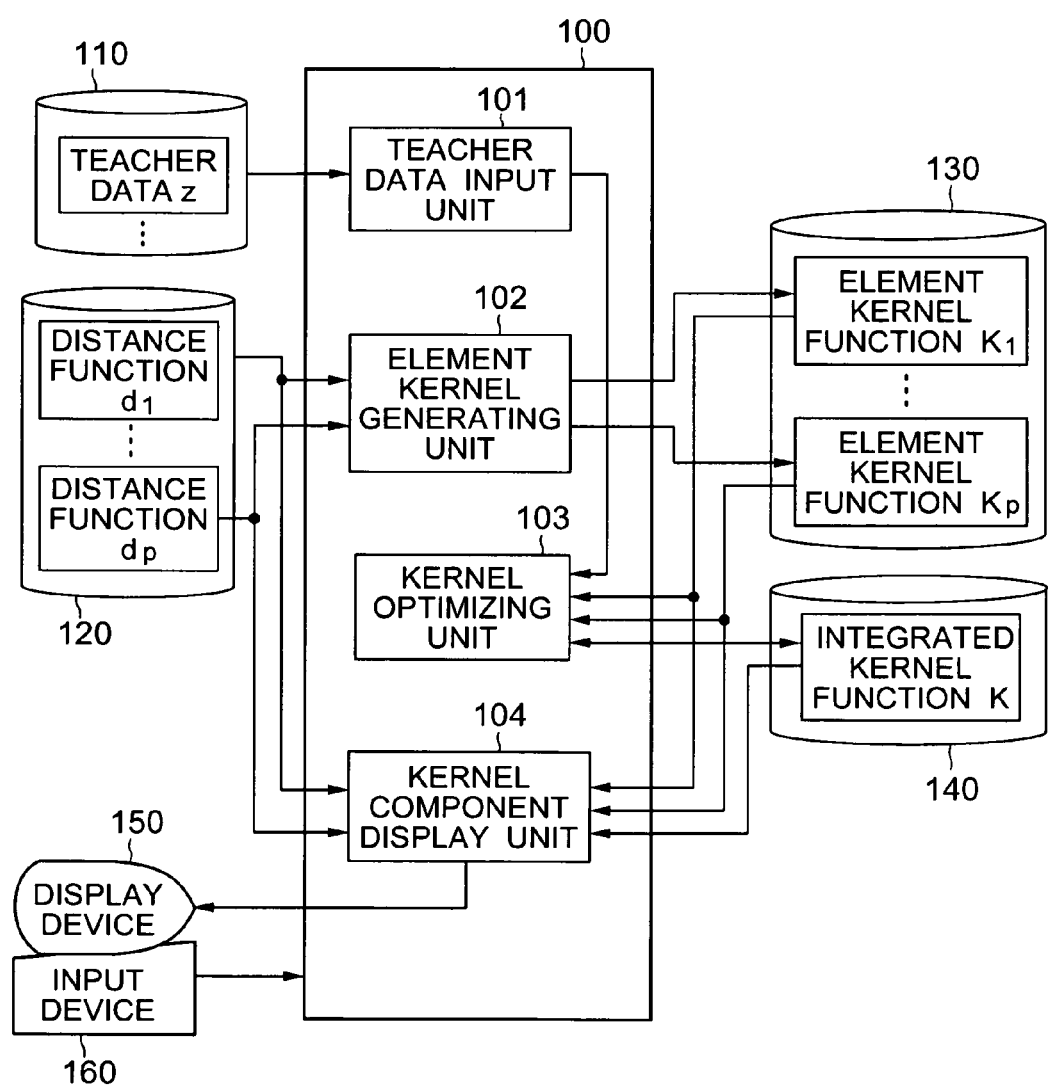
FIG. 1 is a block diagram of a Kernel function generating device according to a first exemplary embodiment of the invention.
Figure 2:
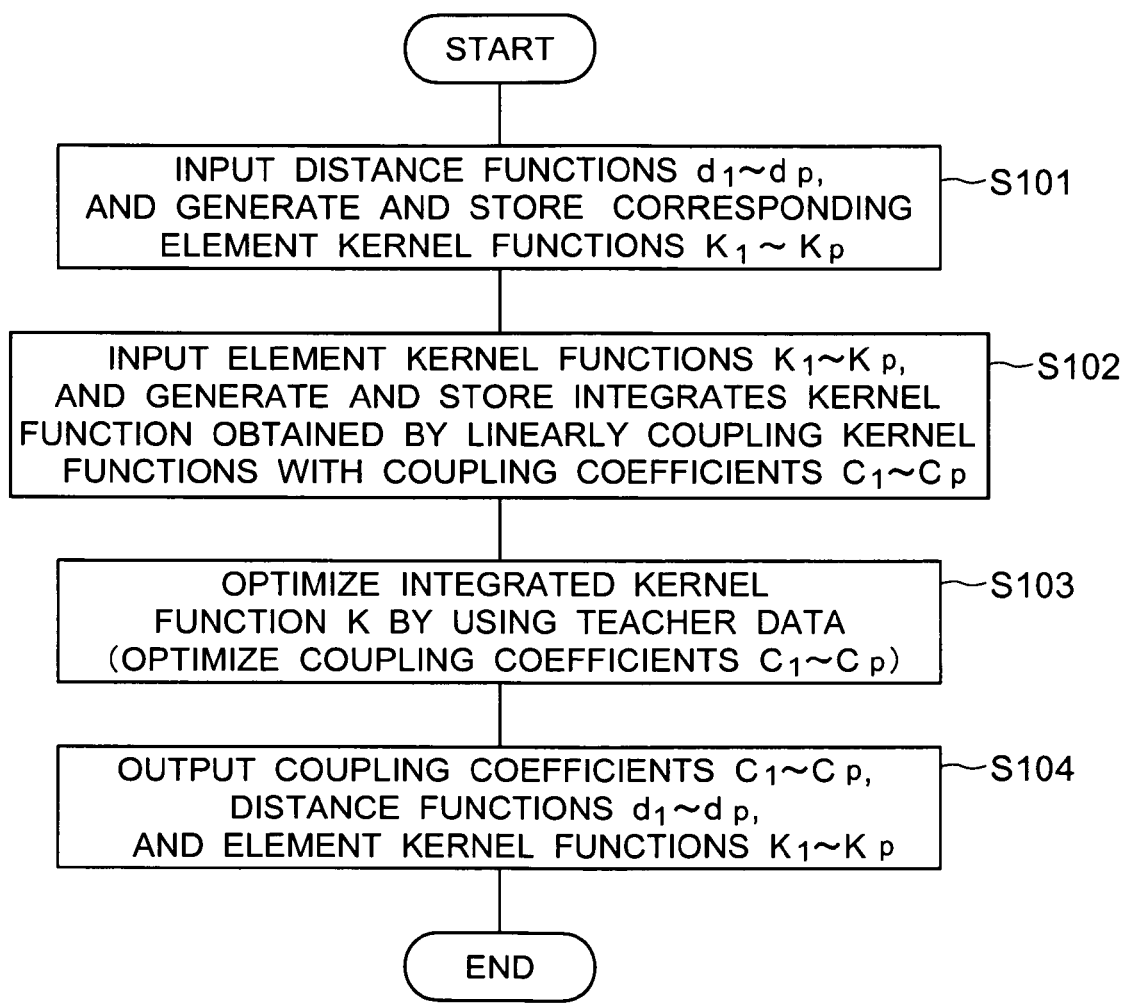
FIG. 2 is a flowchart showing operations of the Kernel function generating device according to the first exemplary embodiment of the invention.
Figure 3:
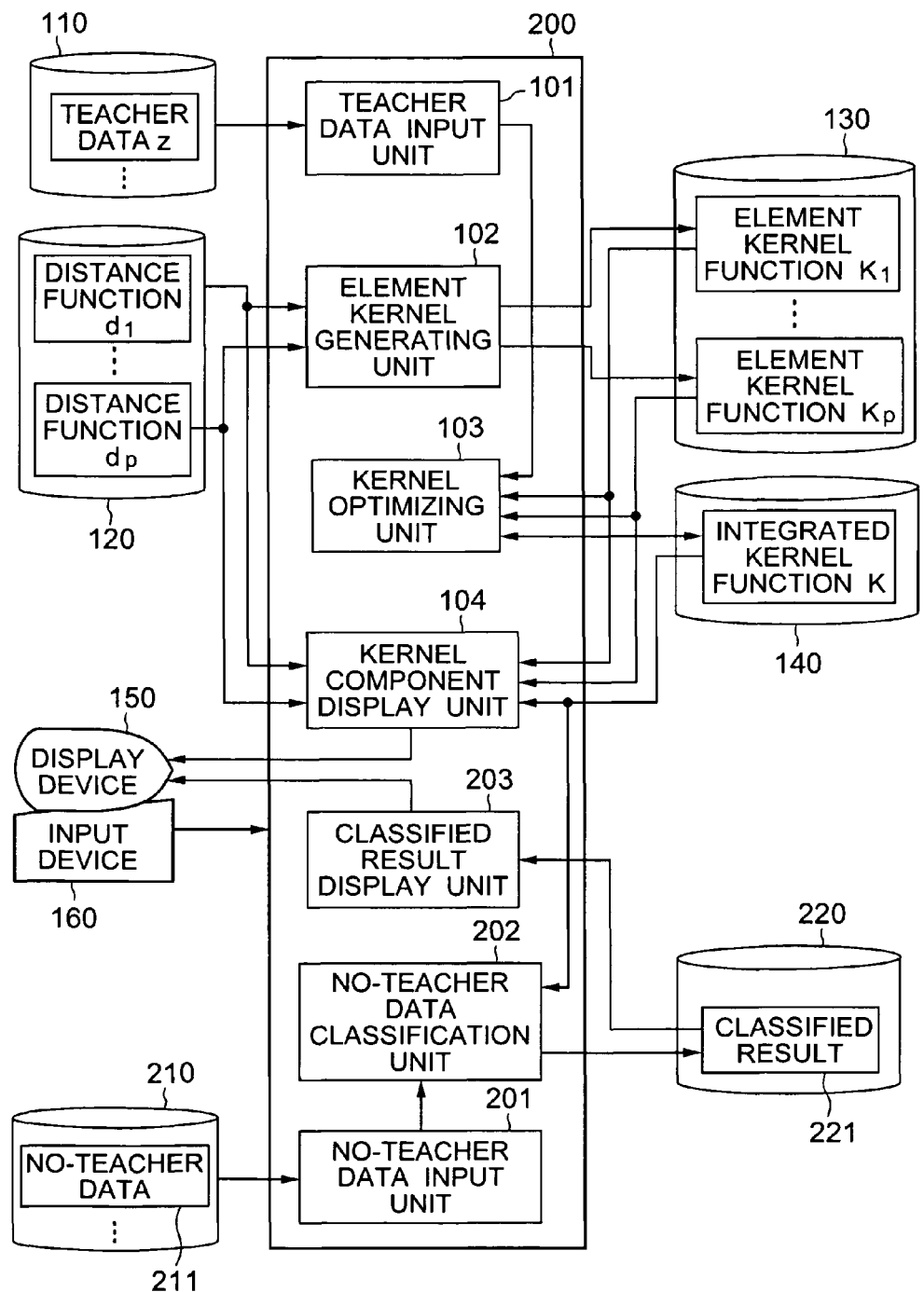
FIG. 3 is a block diagram of a data classification device according to a second exemplary embodiment of the invention.
Figure 4:
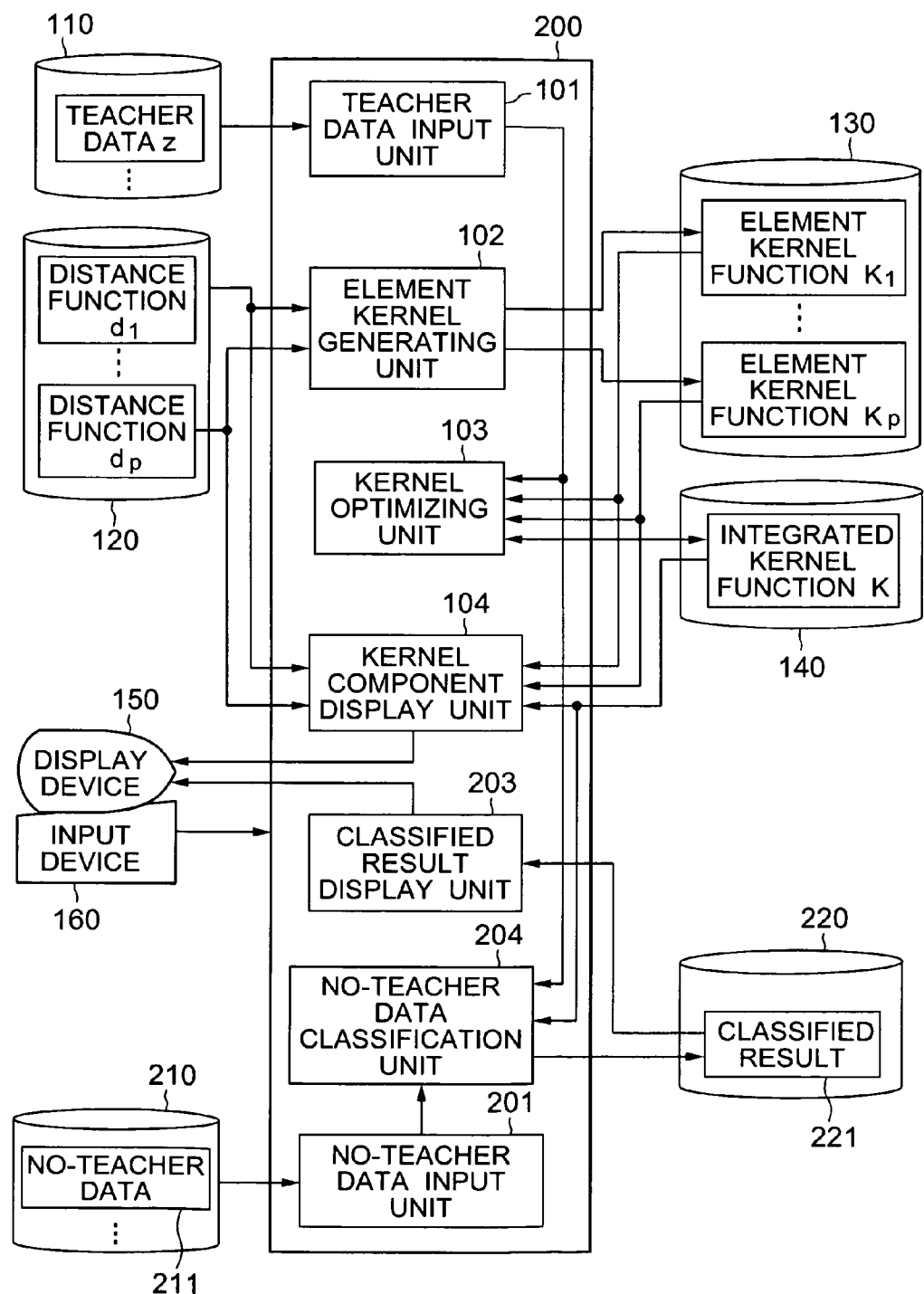
FIG. 4 is a block diagram of a data classification device according to a third exemplary embodiment of the invention.
Figure 5:
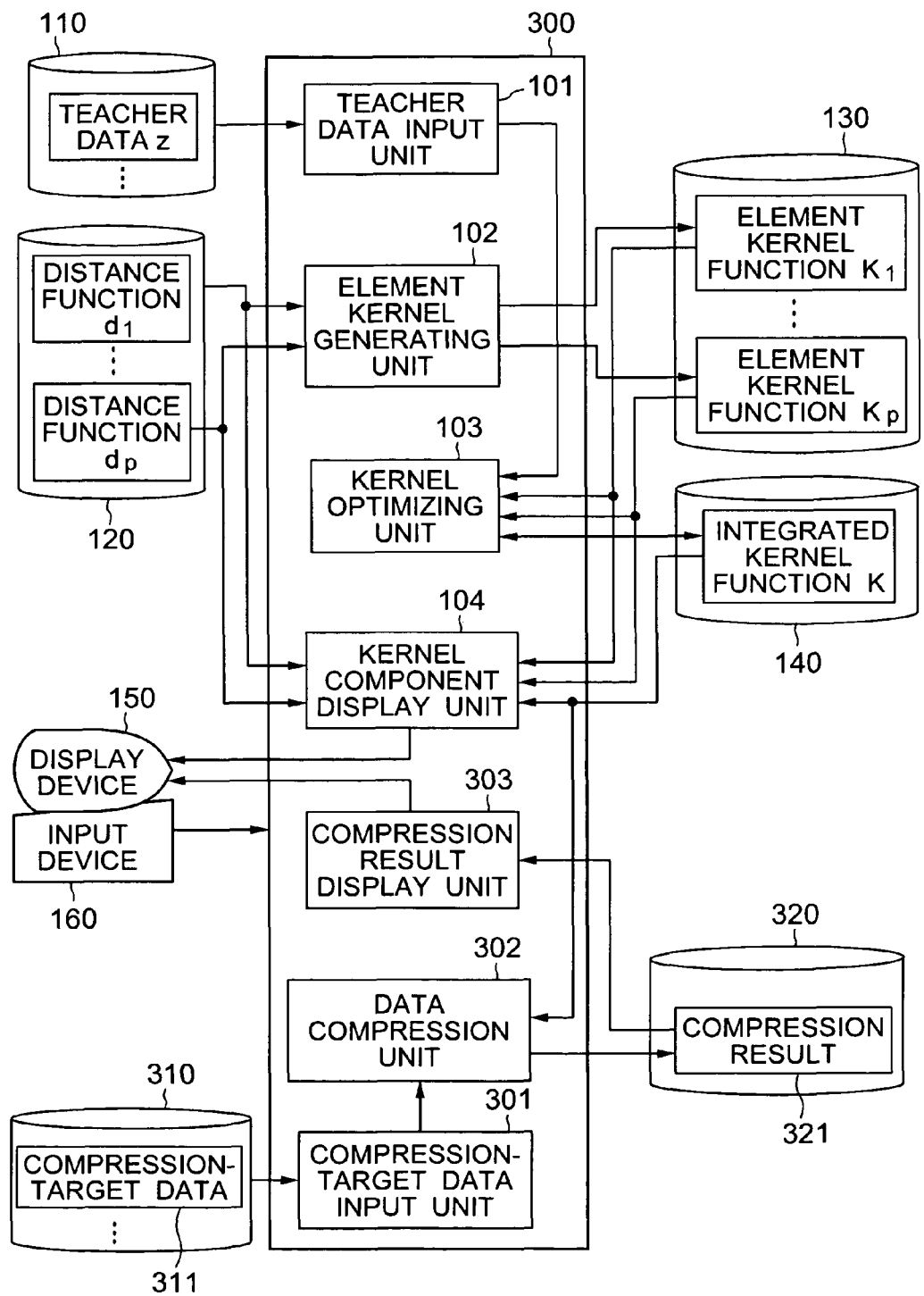
FIG. 5 is a block diagram of a data compression device according to a fourth exemplary embodiment of the invention.
Figure 6:
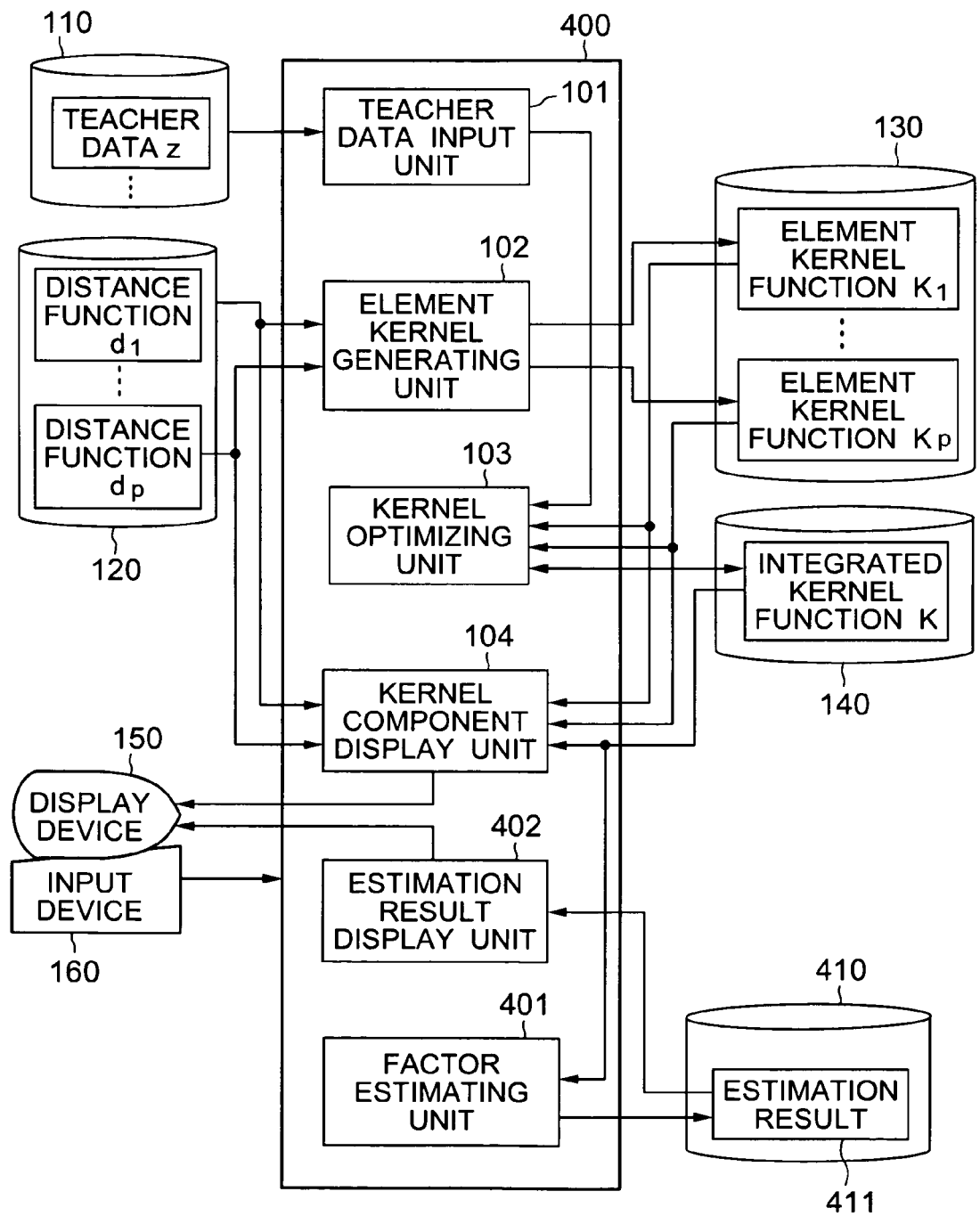
FIG. 6 is a block diagram of a factor estimating device according to a fifth exemplary embodiment of the invention.

100 Processor
101 Teacher data input unit
102 Element Kernel generating unit
103 Kernel optimizing unit
104 Kernel component display unit
110 Teacher data storage unit
120 Distance function storage unit
130 Element Kernel storage unit
140 Integrated Kernel storage unit
150 Display device
160 Input device

The invention claimed is:

1. A Kernel function generating device comprising:
a Kernel generating unit configured to generate respective element Kernel functions for a plurality of distance functions which define distances between data having a plurality of properties;
a Kernel optimizing unit configured to generate an integrated Kernel function by linearly coupling the plurality of generated element Kernel functions with coupling coefficients, and determine the coupling coefficients by using inputted teacher data to optimize the integrated Kernel function; and
a Kernel component output unit configured to read out at least the plurality of distance functions which define distances between data having the plurality of properties or the corresponding element Kernel functions and the corresponding coupling coefficients from a storage device, and output those to an output device.

2. The Kernel function generating device as claimed in claim 1, wherein the Kernel optimizing unit is configured to determine the coupling coefficients in such a manner that the integrated Kernel function separates the teacher data optimally.

3. A Kernel function generating device comprising:
a Kernel generating unit configured to generate respective element Kernel functions for a plurality of distance functions which define distances between data having a plurality of properties; and
a Kernel optimizing unit configured to generate an integrated Kernel function by linearly coupling the plurality of generated element Kernel functions with coupling coefficients, and determine the coupling coefficients by using inputted teacher data to optimize the integrated Kernel function,
wherein the different distance functions consider different kinds of properties.

4. A Kernel function generating device comprising:
a Kernel generating unit configured to generate respective element Kernel functions for a plurality of distance functions which define distances between data having a plurality of properties; and
a Kernel optimizing unit configured to generate an integrated Kernel function by linearly coupling the plurality of generated element Kernel functions with coupling coefficients, and determine the coupling coefficients by using inputted teacher data to optimize the integrated Kernel function,
wherein the different distance functions are of different kinds of distances.

5. A Kernel function generating device comprising:
a Kernel generating unit configured to generate respective element Kernel functions for a plurality of distance functions which define distances between data having a plurality of properties; and
a Kernel optimizing unit configured to generate an integrated Kernel function by linearly coupling the plurality of generated element Kernel functions with coupling coefficients, and determine the coupling coefficients by using inputted teacher data to optimize the integrated Kernel function,
wherein the different distance functions are in different kinds of scales.

6. A Kernel function generating device comprising:
a Kernel generating unit configured to generate respective element Kernel functions for a plurality of distance functions which define distances between data having a plurality of properties; and
a Kernel optimizing unit configured to generate an integrated Kernel function by linearly coupling the plurality of generated element Kernel functions with coupling coefficients, and determine the coupling coefficients by using inputted teacher data to optimize the integrated Kernel function, wherein the teacher data has a same label added to the data belonging to a same cluster and a different label added to the data belonging to a different cluster.

7. The Kernel function generating device as claimed in claim 6, wherein the Kernel optimizing unit is configured to determine values of the coupling coefficients in such a manner that a consistency degree between different clusters become minimum.

8. The Kernel function generating device as claimed in claim 7, wherein the Kernel optimizing unit is configured to determine the values of the coupling coefficients with which a value obtained through dividing a sum of similarities between the data having different labels by a sum of similarities between the data having the same labels becomes minimum.

9. The Kernel function generating device as claimed in claim 7, comprising a no-teacher data classification unit configured to classify no-teacher data by using the integrated Kernel function.

10. The Kernel function generating device as claimed in claim 7, comprising a data compression unit configured to compare the coupling coefficients of the integrated Kernel function with a threshold value to determine a property that corresponds to the coupling coefficient equal to or less than the threshold value as an elimination-target property, and perform dimension compression to eliminate the elimination-target property from compression-target data.

11. The Kernel function generating device as claimed in claim 7, comprising a factor estimating unit configured to compare the coupling coefficients of the integrated Kernel function with a threshold value, and estimate the property corresponding to the coupling coefficient equal to or larger than the threshold value as the property that is a factor for classifying the teacher data into a plurality of groups.

12. A Kernel function generating method as comprising:
generating an integrated Kernel function by linearly coupling a plurality of element Kernel functions with coupling coefficients;
determining the coupling coefficients by using inputted teacher data to optimize the integrated Kernel function; and
reading at least a plurality of distance functions which define distances between data having a plurality of properties or the corresponding element Kernel functions and the corresponding coupling coefficients from a storage device, and outputting those.

13. The Kernel function generating method as claimed in claim 12, comprising:
determining the coupling coefficients in such a manner that the integrated Kernel function separates the teacher data optimally.

14. A non-transitory computer readable recording medium storing a Kernel function generating program to enable a computer to execute:
a function which generates respective element Kernel functions for a plurality of distance functions which define distances between data having a plurality of properties;
a function which generates an integrated Kernel function by linearly coupling the plurality of generated element Kernel functions with coupling coefficients, and determines the coupling coefficients by using inputted teacher data to optimize the integrated Kernel function; and
a function which reads out and outputs at least distance scales or the corresponding element Kernel functions and the corresponding coupling coefficients.

15. The non-transitory computer readable recording medium storing the Kernel function generating program as claimed in claim 14, which enables the computer to execute a function which determines the coupling coefficients in such a manner that the integrated Kernel function separates the teacher data optimally.

16. The non-transitory computer readable recording medium storing the Kernel function generating program as claimed in claim 14, wherein the different distance functions consider different kinds of properties.

17. The non-transitory computer readable recording medium storing the Kernel function generating program as claimed in claim 14, wherein the different distance functions are of different kinds of distances.

18. The non-transitory computer readable recording medium storing the Kernel function generating program as claimed in claim 14, wherein the different distance functions are in different kinds of scales.

19. A non-transitory computer readable recording medium storing a Kernel function generating program to enable a computer to execute:
a function which generates respective element Kernel functions for a plurality of distance functions which define distances between data having a plurality of properties; and
a function which generates an integrated Kernel function by linearly coupling the plurality of generated element Kernel functions with coupling coefficients, and determines the coupling coefficients by using inputted teacher data to optimize the integrated Kernel function,
wherein the teacher data has a same label added to the data belonging to a same cluster and a different label added to the data belonging to a different cluster.

20. The non-transitory computer readable recording medium storing the Kernel function generating program as claimed in claim 19, which enables the computer to execute a function which determines values of the coupling coefficients in such a manner that a consistency degree between different clusters becomes minimum.

21. The non-transitory computer readable recording medium storing the Kernel function generating program as claimed in claim 20, which enables the computer to execute a function which determines the values of the coupling coefficients with which a value obtained through dividing a sum of similarities between the data having different labels by a sum of similarities between the data having the same labels becomes minimum.

22. A non-transitory computer readable recording medium storing a Kernel function generating program to enable a computer to execute:
a function which generates respective element Kernel functions for a plurality of distance functions which define distances between data having a plurality of properties:
a function which generates an integrated Kernel function by linearly coupling the plurality of generated element Kernel functions with coupling coefficients, and determines the coupling coefficients by using inputted teacher data to optimize the integrated Kernel function; and
a function which classifies no-teacher data by using the integrated Kernel function.

23. A non-transitory computer readable recording medium storing a Kernel function generating program to enable a computer to execute:
- a function which generates respective element Kernel functions for a plurality of distance functions which define distances between data having a plurality of properties;
- a function which generates an integrated Kernel function by linearly coupling the plurality of generated element Kernel functions with coupling coefficients, and determines the coupling coefficients by using inputted teacher data to optimize the integrated Kernel function; and
- a function which compares the coupling coefficients of the integrated Kernel function with a threshold value to determine a property that corresponds to the coupling coefficient equal to or less than the threshold value as an elimination-target property, and performs dimension compression to eliminate the elimination-target property from compression-target data.

24. A non-transitory computer readable recording medium storing a Kernel function generating program to enable a computer to execute:
- a function which generates respective element Kernel functions for a plurality of distance functions which define distances between data having a plurality of properties;
- a function which generates an integrated Kernel function by linearly coupling the plurality of generated element Kernel functions with coupling coefficients, and determines the coupling coefficients by using inputted teacher data to optimize the integrated Kernel function; and
- a function which compares the coupling coefficients of the integrated Kernel function with a threshold value, and estimates the property corresponding to the coupling coefficient equal to or larger than the threshold value as the property that is a factor for classifying the teacher data into a plurality of groups.

* * * * *